(12) United States Patent
Ohtsuka

(10) Patent No.: US 6,465,109 B2
(45) Date of Patent: Oct. 15, 2002

(54) PACKAGING FILMS

(75) Inventor: Ryochi Ohtsuka, Toyohashi (JP)

(73) Assignee: Aicello Chemical Co., Ltd., Aichi (JP)

( * ) Notice: Subject to any disclaimer, the term of this patent is extended or adjusted under 35 U.S.C. 154(b) by 0 days.

(21) Appl. No.: 09/790,112

(22) Filed: Feb. 21, 2001

(65) Prior Publication Data

US 2001/0033939 A1 Oct. 25, 2001

(30) Foreign Application Priority Data

Mar. 16, 2000 (JP) ........................................ 2000-073521

(51) Int. Cl.$^7$ ............................................... B32B 27/32
(52) U.S. Cl. ....................... 428/516; 428/218; 428/515; 428/520
(58) Field of Search ................................ 428/218, 515, 428/516, 520

(56) References Cited

U.S. PATENT DOCUMENTS

| 2,845,541 A | | 7/1958 | Berry et al. | |
| 5,281,471 A | * | 1/1994 | Diete et al. | ............. 428/305.5 |
| 5,716,698 A | * | 2/1998 | Schreck et al. | ............. 428/323 |

FOREIGN PATENT DOCUMENTS

| IT | 0 492 720 A | 7/1992 |
| IT | 0 595 252 A | 5/1994 |

* cited by examiner

*Primary Examiner*—D. S. Nakarani
(74) *Attorney, Agent, or Firm*—Knobbe, Martens, Olson and Bear, LLP.

(57) ABSTRACT

A film suitable for spiral packaging is highly sealable and provides a strong self-adhesiveness of the front and reverse sides of superposed films upon spiral packaging. The film includes two layers comprising (A) a layer including a resin composition containing at least one kind of adhesives-rendering resin having a resin density of 0.950 g/cm$^3$, such as rosin resins, at a concentration of 0.002 to 12.0% by weight in a polyolefin resin having a resin density of more than 0.910 g/cm$^3$, and (B) another layer including a resin composition containing the abovementioned adhesiveness-rendering resin at a concentration of 0.05 to 25.0% by weight and a plasticizing oil at a concentration of 0.01 to 8.0% by weight in a low density linear polyethylene resin having a resin density of 0.860 to 0.920 g/cm$^3$.

13 Claims, No Drawings

PACKAGING FILMS

BACKGROUND OF THE INVENTION

1. Field of the Invention

The present invention relates to laminated film composites suitable for use as a material would spirally in layers for packaging (hereinafter referred to as "spiral packaging") for glass products and metal products.

The present invention relates to laminated film composites suitable for spiral packaging to prevent products from dust adhesion and damage when used for packaging various products such as coils and plates made of glass or metals.

Film laminates for packaging according to the present invention exhibit excellent adhesiveness between film surfaces owing to the self-adhesiveness of the front side and reverse side of the resin films. This prevents dust and rainwater from entering packages of assembly packaging of small products or spiral packaging of large products, so that the products can be well protected from getting dirty and rusting.

2. Description of the Related Art

Conventionally, packaging films made of thermoplastic resins are generally used for packaging ornaments, such as coils and plates made of glass or metals, metal products, or the like to prevent them from rusting or getting dusty. For example, films for preventing metal products from rusting are made by adding a volatile (or gasifiable) rust preventive to a thermoplastic resin and molding into a film using hot-melt extrusion molding (Japanese Patent No. S47-4295; Japanese Patent No. S53-2449). Today, these corrosion-inhibiting films are widely used in various areas because they are transparent and can easily be sealed by heat, which is their advantage over rustproof paper products. However, the high temperature used for the melt molding of the films, as well as the heat generated from the shearing of the resins per se increases the temperature of the resins, resulting in a loss of the volatile rust preventive. Even if a large amount of the volatile rust preventive be incorporated, very little of it be remained in the molded films. Thus, adequate rust prevention could not be maintained for prolonged periods.

Furthermore, resin films for preventing adhesion of dust or the like cannot be directly sealed because they have no self-adhesiveness. Therefore, in case of general bag packaging, the opening part has to be sealed with a separate tape made of adhesive materials, or outside air is obstructed by sealing the film at necessary places using a heat-sealing machine in order to prevent entry of dust and water. Either case is troublesome and complicated.

Nevertheless, thermoplastic resin films made of general-purpose resins such as low density polyethylene, high density polyethylene, polypropylene, and soft polyvinyl chloride resins are used for general packaging because of their easy availability and an economical advantage, i.e., low cost.

However, an adhesive is applied to the sealing site of the films upon packaging because the films per se do not have enough self-adhesiveness (Japanese Patent Laid Open, No. S61-21174).

In applying an adhesive to films for packaging, the adhesive has to be diluted with an organic solvent to apply it to the surface of the film base material and then dried. This pollutes the working environment due to dispersion of volatilized organic solvent contained in the adhesive and uneconomically increases the number of steps.

Furthermore, attempts were made to use ethylene vinylacetate copolymer resin films for packaging of metal products in place of the abovementioned general-purpose resins. In particular, a stretchable film using an ethylene vinylacetate copolymer resin was developed, in which self-adhesiveness was improved by increasing the content of vinyl acetate (Japanese Patent Laid Open, No. S60-155210). However, this film was not satisfactory, since rust was induced on metal products contacting the packaging film possibly because the resin per se has an intramolecular acetic acid group, or in case of non metal products, dust heavily adhered to the products. Moreover, the raw material, vinyl acetate, had a problematic odor.

SUMMARY OF THE INVENTION

Considering the abovementioned state, an object of the present invention is to develop a film suitable for packaging various kinds of products, wherein said film causes no environmental pollution from the use of organic solvents or the like, enables easy packaging, has strong self-adhesiveness, in particular on superposing sites, does not contaminate the working environment, and is highly economical.

A packaging film developed in the present invention is a laminated composite of resin films, each having a specific composition exhibiting mutual adhesiveness. This film is highly self-adhesive having an adhering property between the front side and reverse side of the film facing each other so as to prevent dust or water from entering the package, thus making it possible to provide products that will not lose their commercial value after prolonged storage. A packaging film laminate of the present invention can further exhibit a sealing effect particularly by spirally packaging products. Furthermore, a self-adhering effect can be exhibited, along with a rust preventing property, and a fragrance property by additionally placing a resin film containing a volatile component between the abovementioned layers as an intermediate layer.

The basic constitution of the present invention is a packaging film laminate comprising a laminated film in which a resin film layer obtained by mixing a specified amount of an adhesiveness-rendering resin having a specified range of resin density with an olefin resin base material having a similarly specified range of resin density is laminated with a resin film layer obtained by blending a specified amount of an adhesiveness-rendering resin having a specified range of resin density and a specified amount of a plasticizing oil with a linear polyethylene resin base material having a specified range of resin density.

Namely, the present invention comprises a laminated film composite suitable for spiral packaging, which comprises at least two layers containing (A) one layer comprising a resin composition containing at least one kind of adhesiveness-rendering resin having a resin density of more than 0.950 g/cm$^3$ selected from rosin resins, terpene resins or petroleum resins at a concentration of 0.002 to 12.0% by weight in a polyolefin resin having a resin density of more than 0.910 g/cm$^3$ (layer A), and (B) another layer comprising a resin composition containing at least one kind of resin selected from the abovementioned adhesiveness-rendering resins at a concentration of 0.05 to 25.0% by weight and at least one kind of plasticizing oil selected from mineral oils, polybutene, polyisobutylene, liquid polyacrylates and lanolin at a concentration of 0.01 to 8.0% by weight in a linear low density polyethylene resin having a resin density of 0.860 to 0.920 g/cm$^3$ (layer B).

Furthermore, the present invention also comprises a laminated film composite suitable for spiral packaging, which comprises at least two layers containing (A) one layer comprising a resin composition containing at least one kind of adhesiveness-rendering resin having a resin density of more than 0.950 g/cm$^3$ selected from rosin resins, terpene resins or petroleum resins at a concentration of 0.05 to 25.0% by weight and at least one kind of plasticizing oil selected from mineral oils, polybutene, polyisobutylene, liquid polyacrylates and lanolin at a concentration of 0.01 to 8.0% by weight in a polyolefin resin having a resin density of more than 0.910 g/cm$^3$ (layer A), and (B) another layer comprising a resin composition containing at least one kind of resin selected from the abovementioned adhesiveness-rendering resins at a concentration of 0.002 to 12.0% by weight in a linear low density polyethylene resin having a resin density of 0.860 to 0.920 g/cm$^3$ (layer B).

Furthermore, the present invention also comprises a laminated film composite suitable for spiral packaging comprising at least three layers further containing (C) one layer comprising a composition containing at least one kind of volatile additive comprising amine compounds, heterocyclic compounds, nitrite compounds or benzoate compounds in a thermoplastic resin, in addition to the two layer laminated composite composed of the abovementioned layer A and layer B.

DETAILED DESCRIPTION OF THE PREFERRED EMBODIMENT

Examples of polyolefin resins used in the abovementioned composition (A) include low density polyethylene, medium density polyethylene, linear low density polyethylene, high density polyethylene, polypropylene or butene-1 polymers; however, it is essential to use a resin having a resin density of more than 0.910 g/cm$^3$ as the base material. If a base material of composition (A) having a resin density of less than 0.910 g/cm$^3$ is used, the physical strength of the film is reduced and its self-adhesiveness becomes too strong. As a result, when the film is rolled, it becomes difficult to separate stuck films, and a releasing agent or antiblocking agent has to be added, which complicates the procedure.

Examples of linear low density polyethylene resins to be used in the abovementioned composition (B) include those polymerized by a solution method or a gas-phase method using a general Ziegler catalyst, and linear low density polyethylene resins polymerized using a single-site metallocene catalyst. Further, ethylene-α-olefin copolymer resins can also be used in place of the abovementioned linear low density polyethylene resins. Resins obtained by copolymerizing at least one kind of α-olefin which can be copolymerized with ethylene, selected from butene-1, hexene-1, octene-1, 4-methylpentene-1, or the like, can be used as these copolymer resins. In the present invention, in particular, linear low density polyethylene resins polymerized using a single-site metallocene catalyst are characterized in that they have a uniform even activity point and an excellent adhesive strength because of their narrow molecular weight distribution and suppress the movement of low molecular components to the subject for adhesion, and thus can be used advantageously for spiral packaging.

Adhesiveness-rendering resins to be used both in the abovementioned composition (A) and composition (B) must have a resin density of more than 0.950 g/cm$^3$ and suitable resins include rosin resins, terpene resins and petroleum resins. More particularly, examples of rosin resins include rosin, rosin esters, and hydrogenated rosin esters, examples of terpene resins include terpene, α-pinene resins, β-pinene resins, aromatic denatured terpene resins and dipentene resins, and examples of petroleum resins include aliphatic petroleum resins, dicyclopentadiene petroleum resins, hydrogenated dicyclopentadiene petroleum resins, and aromatic petroleum resins.

These adhesiveness-rendering resins are appropriately used in both composition (A) and composition (B) in a ratio of 0.001 to 15.0% by weight, preferably 0.002 to 12.0% by weight when no plasticizing oil is added to the compositions, or in a ratio of 0.01 to 30.0% by weight, preferably 0.05 to 25.0% by weight when a plasticizing oil is used.

Adhesiveness-rendering resins contained at the abovementioned concentration can control adhesiveness of the superposed surfaces of the film upon spiral packaging. If the resin density of these adhesiveness-rendering resins is less then 0.950 g/cm$^3$, a satisfactory adhesiveness cannot be attained, and the volatile additive cannot exert its effect for providing fragrance or preventing rust when a layer C exists, as described later.

Further, adhesiveness-rendering resins to be added to composition (A) and composition (B) have a glass transition temperature (Tg) of 70 to 80° C., which is higher than that of the base material, i.e., thermoplastic resin. Therefore, in the case where layer C is placed between layer A and layer B, loss of volatile components by volatilization can be prevented by the action of the adhesiveness-rendering resins having the higher glass transition temperature even when the film in layer C is cooled after melt molding.

Layer A contains an adhesiveness-rendering resin at a concentration of 0.001 to 15.0% by weight, preferably 0.002 to 12.0% by weight in cases where the abovementioned plasticizing oil is not added, or at a concentration of 0.01 to 30.0% by weight, preferably 0.05 to 25.0% by weight in cases where the abovementioned plasticizing oil is added, thereby the front and reverse sides of the films facing each other upon packaging can exhibit adhesiveness even though the thermoplastic resin per se has no self-adhesiveness. Furthermore, layer B has a linear low density polyethylene resin having a resin density of 0.860 to 0.920 g/cm$^3$ as a base resin and contains a resin appropriately selected from a group of adhesiveness-rendering resins to be added to layer A at a concentration of 0.001 to 15.0% by weight, preferably 0.002 to 12.0% by weight in cases where a plasticizing oil is not added to the composition, or at a concentration of 0.01 to 30.0% by weight, preferably 0.05 to 25.0% by weight in cases where a plasticizing oil is not used, thereby an appropriate adhesiveness to a subject for adhesion can be further attained. The front and reverse sides of the films facing each other can exhibit adhesiveness particularly upon spiral packaging.

As mentioned above, the detachability of film rolled after molding can be controlled by the amount of the adhesiveness-rendering resin and the plasticizing oil added to layer A and layer B so that film of a rolled product can be easily peeled off.

Linear low density polyethylene resins to be used in the abovementioned composition (B) require a resin density of 0.860 to 0.920 g/cm$^3$. Resins having a resin density of less than 0.860 g/cm$^3$ generally have a high copolymer content and are not appropriate because they decreases the mechanical strength of the film upon packaging. Further, resins having a resin density of more than 0.920 g/cm$^3$ will decrease the adhesiveness between the front side layer and reverse side layer, corresponding to adhesiveness between films, which makes it difficult to attain the primary object in terms of a self-sealing property.

Further, a melt flow rate (MRF) of the linear low density polyethylene resins varies depending on the molding method to be used but preferably ranges between 0.8 and 9.5 g/10 min (190° C.) from the viewpoints of mechanical strength and workability. A mixture of one or more kinds of low density polyethylene resins can be used.

Furthermore, adhesiveness can be improved further by adding a plasticizing oil to either one of the abovementioned compositions.

Namely, in addition to an adhesiveness-rendering resin, one or more kinds of plasticizing oils selected from mineral oil, polybutene, polyisobutylene, liquid acrylates, and lanolin are added to the abovementioned composition (A). The total amount of plasticizing oils can be about 0.001 to 10.0% by weight, preferably 0.01 to 8.0% by weight. This is to provide an initial adhesiveness with low stress upon spiral packaging or adhesiveness at a low temperature; it is difficult to exert these effects at a concentration of less than 0.001% by weight. If the concentration of the abovementioned plasticizing oils is more than 10.0% by weight, the plasticizing oils emigrate to the packaged substance, which soils the surface of the resin film and reduces the mechanical strength of the packaging film. The abovementioned plasticizing oils can be used alone or as a mixture of more than 2 kinds without any problem.

Similar effects can be attained by adding the same amount of plasticizing oils to the abovementioned composition (B). Plasticizing oils can be added to either composition (A) or composition (B) to improve adhesiveness; however, they are preferably added to composition (B) in case where volatile additives are used.

The base resin for composition (C) can be any thermoplastic resin and is not particularly restricted. Examples of preferably used thermoplastic resins include the same kind of polyolefin resins used for composition (A), such as low density polyethylenes, medium density polyethylenes, linear low density polyethylenes, high density polyethylenes, polypropylene, and butene-1 polymers; copolymer resins such as ethylene-vinyl acetate and acrylic acid esters; polystyrene resins; ionomer resins, polyester resins and polyamide resins.

Furthermore, in composition (C), thermoplastic resins for a base material have to contain a volatile additive. A volatile additive having a melting point relatively close to that of the thermoplastic resins used as the base material, e.g., 80 to 250° C., can be preferably used. In particular, the range of selection for thermoplastic resins to be used can be advantageously broadened by adding a volatile additive having a melting point of more than 150° C. Further, the same level of efficacy can be attained by adding a volatile additive to layer A and/or layer B, regardless of the presence of layer C.

Furthermore, volatile additives appropriately used in layers of these compositions can be those used as anticorrosion agents and/or aromatics; they are added at a concentration at least 0.01 to 6.0% by weight to attain their effect. Volatile additives appropriate for these usages are amine compounds, heterocyclic compounds, nitrite compounds, benzoate compounds, or the like. Examples of the amine compounds include cyclohexylamine carbamate and cyclohexylamine laurate; examples of the heterocyclic compounds include carboxybenzotriazole, tolyltriazole, benzotriazole, and 3-methyl-5-hydroxypyrazole; examples of the nitrite compounds include dicyclohexylammonium nitrite and sodium nitrite; and examples of the benzoates include ammonium benzoate.

1. The effect of the abovementioned volatile additives is to provide fragrance and prevent rust. The effect varies depending on the type and the amount of the volatile additives used. It has been confirmed that the volatile additives in the abovementioned compositions are effective in providing aroma and preventing rust at a concentration of 0.01 to 6.0% by weight. The volatile additives are not satisfactorily effective at a concentration less than 0.01% by weight. Further, if the concentration is more than 6.0% by weight, molding stability upon melt molding is decreased, or the volatile component is deposited onto the film surface after molding, which decreases the adhesiveness of the film to the subject for adhesion or between films, and reduces the strength of the film itself.

From the viewpoints of adhesiveness and recyclability, the same type of resins can be used commonly for composition (A), composition (B) and composition (C); for example, polyethylene resins can be used for both composition (A) and composition (B). However, it is practical to choose an appropriate combination within the range of the abovementioned components, taking their economical merit and characteristics into consideration.

For example, in cases where a polyolefin resin is used as the base material for each composition, an addition of a volatile additive to the polyolefin resin and an addition of adhesiveness-rendering resin and a plasticizing oil to a linear low density polyethylene resin can be carried out by mixing resin pellets, resin powders or the like using an appropriate kneading method and preparing a masterbatch using a molding machine such as a Banbury mixer, ribbon blender, mixing roll kneader, and two-shaft kneading extruder. When a plasticizing oil is used, it can be injected from the side of a machine during the kneading process to prepare a masterbatch.

These base material resins and blending agents are mixed at specified rates to form into films. Molding methods are not particularly restricted; however, generally, melt extrusion molding by an upward air-cooling inflation method, downward water-cooling inflation method, T-die cast method, tubular drawing method, and tenter two-shaft drawing method can be preferably used. Molding can be generally carried out at a resin temperature of 120 to 240° C., preferably 140 to 200° C. Rapid cooling after melt extrusion molding will more effectively prevent loss of volatile components during melt molding.

Packaging films according to the present invention are generally transparent; however, additives such as UV light absorbing agents, thermal stabilizers, aging preventing agents, antioxidants, pigments, dyes, antiblocking agents, and parting agents can be added, if necessary. Furthermore, the packaging films can be subjected to a corona discharge or electron cross-linking, or in cases where transparency is not particularly required for use, embossing, printing or coloring can be carried out.

Film laminate composites of the abovementioned compositions (A), (B) and (C) of the present invention can be appropriately produced by a process in which individually prepared appropriate masterbatches are polymer-blended at a specified blending rate, and then the resulting compositions are formed into films by a conventional method for lamination.

In Examples and Comparative Examples of the present invention, each layer is produced by a masterbatch method. Methods of preparing a masterbatch containing an adhesiveness-rendering resin, a masterbatch containing a plasticizing resin, and further a masterbatch containing a volatile resin, used in Examples and Comparative Examples, are explained as follows.

Further, the present invention is not limited by the Examples and various changes and modifications are possible without departing from the scope of the invention as set out in the claims.

Preparation of first masterbatch

To 60% by weight of a linear low density polyethylene resin (#0358, a product of Idemitsu Petrochemical Co., Ltd; resin density: 0.930 g/cm$^3$, MFR: 3.0 g/10 min) was added 40% by weight of an adhesiveness-rendering resin, i.e., hydrogenated dicyclopentadiene (#5320HC, a product of Tonex; density: 1.07 g/cm$^3$; number average molecular weight: Mn=360), and the admixture was subjected to melt extrusion using a two-shaft kneading extruder at a molding temperature of 170° C. to prepare the first masterbatch in a pellet form by pelleting the resulting resin having a resin density of 0.986 g/cm$^3$ using a pelletizer.

Preparation of second masterbatch

To 70% by weight of a linear low density polyethylene resin (#0128, a product of Idemitsu Petrochemical Co., Ltd; resin density: 0.915 g/cm$^3$, MFR: 1.0 g/10 min) was added 30% by weight of liquid polybutene (#2000H, a product of Idemitsu Petrochemical Co., Ltd.; specific gravity: 1.07 g/cm$^3$) as a plasticizing oil, and the admixture was subjected to melt extrusion using a two-shaft kneading extruder at a molding temperature of 160° C. to prepare the second masterbatch in a pellet form by pelleting the resulting resin having a resin density of 0.912 g/cm$^3$.

Preparation of third masterbatch

To 93% by weight of a low density polyethylene resin (#F-218-1, a product of Idemitsu Petrochemical Co., Ltd; resin density: 0.919 g/cm$^3$, MFR: 1.0 g/10 min) was added 7% by weight of benzotriazole as a volatile additive, and the admixture was subjected to melt extrusion using a two-shaft kneading extruder at a molding temperature of 125° C. to prepare the third masterbatch in a pellet form by pelleting the resulting resin having a resin density of 0.920 g/cm$^3$.

Next, the constitution of the present invention will be explained. Namely, results of experiments for various properties of films of Examples 1 to 4 and films of corresponding Comparative Examples 1 to 4 will be explained.

Further, the present invention is not limited to the constitution of the following Examples.

EXAMPLE 1

Layer "A1": To 100 parts by weight of a linear low density polyethylene resin (#2037, a product of Dow Plastics; resin density: 0.935 g/cm$^3$, MFR: 2.5 g/10 min) were added 2.5 parts by weight of the first masterbatch to obtain a resin layer containing 0.976% by weight of the adhesiveness-rendering resin.

Layer "B1": To 100 parts by weight of a low density linear polyethylene resin (#EG8150, a product of Dow Plastics; resin density: 0.870 g/cm$^3$, MFR: 5.0 g/10 min) were added 15 parts by weight of the first masterbatch and 17 parts by weight of the second masterbatch to obtain a resin layer containing 4.55% by weight of the adhesiveness-rendering resin and 3.86% by weight of the plasticizing oil.

Next, a film laminate comprising two layers having a total thickness of 80 μm, composed of layer "A1" having a thickness of 40 μm and layer "B1" having a thickness of 40 μm, was produced by a T die casting method in which resins were subjected to melt extrusion at 180° C. and cooling at 25° C. using a cooling roll.

EXAMPLE 2

Layer "A2": To 100 parts by weight of a linear low density polyethylene resin (#FV101, a product of Sumitomo Chemical Co., Ltd.; resin density: 0.923 g/cm$^3$, MFR: 2.0 g/10 min) were added 9 parts by weight of the first masterbatch to obtain a resin layer having a resin density of 0.928 g/cm$^3$ and containing 3.30% by weight of the adhesiveness-rendering resin.

Layer "B2": To 100 parts by weight of a linear low density polyethylene resin (#FV203, a product of Sumitomo Chemical Co., Ltd.; resin density: 0.912 g/cm$^3$, MFR: 2.0 g/10 min) were added 2 parts by weight of the first masterbatch and 3 parts by weight of the second masterbatch to obtain a resin layer having an average resin density of 0.913 g/cm$^3$ and containing 0.76% by weight of the adhesiveness-rendering resin and 0.86% by weight of the plasticizing oil.

Intermediate layer "C2": To 100 parts by weight of a low density polyethylene resin (#F-218-1, a product of Sumitomo Chemical Co., Ltd.; resin density: 0.919 g/cm$^3$, MFR: 1.0 g/10 min) were added 5 parts by weight of the third masterbatch to obtain a resin layer having an average resin density of 0.919 g/cm$^3$ and containing 0.33% by weight of the volatile additive.

Next, a film laminate comprising 3 layers having a total thickness of 80 μm, composed of layer "A2" having a thickness of 20 μm, layer "C2" having a thickness of 40 μm, and layer "B2" having a thickness of 20 μm, wherein the resin density was layer "A2">layer "B2", was produced by a T die casting method, in which resins were subjected to melt extrusion at a molding temperature of 200° C. and cooling at 25° C. using a cooling roll.

EXAMPLE 3

A film laminate was produced by changing the amount of masterbatches added to layer "A2" and layer "B2" in Example 2.

Layer "A3": To 100 parts by weight of a linear low density polyethylene resin (#FV101, a product of Sumitomo Chemical Co., Ltd.; resin density: 0.923 g/cm$^3$, MFR: 2.0 g/10 min) were added 2 parts by weight of the first masterbatch to obtain a resin layer having a resin density of 0.924 g/cm$^3$ and containing 0.78% by weight of the adhesiveness-rendering resin.

Layer "B3": To 100 parts by weight of a linear low density polyethylene resin (#FV203, a product of Sumitomo Chemical Co., Ltd.; resin density: 0.912 g/cm$^3$, MFR: 2.0 g/10 min) were added 40 parts by weight of the first masterbatch and 4.2 parts by weight of the second masterbatch to obtain a resin layer having an average resin density of 0.933 g/cm$^3$ and containing 11.1% by weight of the adhesiveness-rendering resin and 0.87% by weight of the plasticizing oil.

Intermediate layer "C3" was made to have the same composition as layer "C2" in Example 2.

Next, a film laminate comprising 3 layers having a total thickness of 80 μm, composed of layer "A3" having a thickness of 20 μm, layer "C3" having a thickness of 40 μm, and layer "B3" having a thickness of 20 μm, wherein the resin density was layer "A3"<layer "B3", was produced by a T die casting method, in which resins were subjected to melt extrusion at a molding temperature of 200° C. and cooling at 25° C. using a cooling roll.

EXAMPLE 4

Layer "A4": To 100 parts by weight of a linear low density polyethylene resin (#2037, a product of Dow Plastics; resin density: 0.935 g/cm$^3$, MFR: 1.5 g/10 min) were added 4.0 parts by weight of the first masterbatch and 6.0 parts by weight of the second masterbatch to obtain a resin layer containing 1.45% by weight of the adhesiveness-rendering resin and 1.64% by weight of the plasticizing oil.

Layer "B4": To 100 parts by weight of a linear low density polyethylene resin (#FW1650, a product of Dow Plastics; resin density: 0.902 g/cm³, MFR: 3.0 g/10 min) were added 3.0 parts by weight of the first masterbatch to obtain a resin layer containing 1.17% by weight of the adhesiveness-rendering resin.

Next, a film laminate comprising 2 layers having a total thickness of 80 µm, composed of layer "A4" having a thickness of 40 µm and layer "B4" having a thickness of 40 µm, was produced by a T die casting method, in which resins were subjected to melt extrusion at 180° C. and cooling at 25° C. using a cooling roll.

COMPARATIVE EXAMPLE 1

Layer "a1": A monolayer film having a thickness of 80 µm, composed of a linear low density polyethylene resin (#2037, a product of Dow Plastics; resin density: 0.935 g/cm³, MFR: 2.5 g/10 min) used in layer "A1" in Example 1 containing no adhesiveness-rendering resin or plasticizing oil, was produced by a T die casting method, in which resins were subjected to melt extrusion at a molding temperature of 180° C. and cooling at 25° C. using a cooling roll.

COMPARATIVE EXAMPLE 2

Layer "a2": A resin was made to have the same composition as layer "A1" in Example 1.

Layer "b2": To 100 parts by weight of a linear low density polyethylene resin (#EG8150, a product of Dow Plastics; resin density: 0.870 g/cm³, MFR: 5.0 g/10 min) were added 12.7 parts by weight of the first masterbatch to obtain a resin layer containing 4.55% by weight of the adhesiveness-rendering resin.

Next, a film laminate comprising 2 layers having a total thickness of 80 µm, composed of layer "a2" having a thickness of 40 µm and layer "b2" having a thickness of 40 µm, was produced by a T die casting method in which resins were subjected to melt extrusion at a molding temperature of 180° C. and cooling at 25° C. using a cooling roll.

COMPARATIVE EXAMPLE 3

Layer "a3": A resin layer comprising a linear low density polyethylene resin (#2037, a product of Dow Plastics; resin density: 0.935 g/cm³, MFR: 2.5 g/10 min) was prepared.

Layer "b3": To 100 parts by weight of a linear low density polyethylene resin (#EG8150, a product of Dow Plastics; resin density: 0.870 g/cm³, MFR: 5.0 g/10 min) used in layer "B1" in Example 1 were added 15 parts by weight of the first masterbatch and 17 parts by weight of the second masterbatch to obtain a resin layer containing 4.55% by weight of the adhesiveness-rendering resin and 3.86% by weight of the plasticizing oil.

Next, a film laminate comprising 2 layers having a total thickness of 80 µm, composed of layer "a3" having a thickness of 40 µm and layer "b3" having a thickness of 40 µm, was produced by a T die casting method, in which resins were subjected to melt extrusion at a molding temperature of 180° C. and cooling at 25° C. using a cooling roll.

COMPARATIVE EXAMPLE 4

Layer "a4": A resin layer comprising a linear low density polyethylene resin (#FV101, a product of Sumitomo Chemical Co., Ltd.; resin density: 0.923 g/cm³, MFR: 2.0 g/10 min) used in layer "A2" in Example 2 was prepared.

Layer "b4": A resin layer comprising a low density linear polyethylene resin (FV203, a product of Sumitomo Chemical Co., Ltd.; resin density: 0.912 g/cm³, MFR: 2.0 g/10 min) used in layer "B" in Example 2 was prepared.

Layer "c4": To 100 parts by weight of a low density polyethylene resin (#F-218-1, a product of Sumitomo Chemical Co., Ltd.; resin density: 0.919 g/cm³, MFR: 1.0 g/10 min) used in intermediate layer "C2" in Example 2 were added 5 parts by weight of the third masterbatch to obtain a resin layer having a resin density of 0.919 g/cm³ and containing 0.33% by weight the volatile additive.

Next, a film laminate comprising 3 layers having a total thickness of 80 µm, composed of layer "a4" having a thickness of 20 µm, layer "c4" having a thickness of 40 µm, and layer "b4" having a thickness of 20 µm, wherein the resin density was layer "a4">layer "b4", was produced by a T die casting method, in which resins were subjected to melt extrusion at a molding temperature of 200° C. and cooling at 25° C. using a cooling roll.

As for the films thus obtained in the abovementioned Examples 1 to 4 and Comparative Examples 1 to 4, adhesion strength to subjects for adhesion (e.g., stainless sheet, glass sheet), which correspond to products, and shear separation adhesive strength between the facing films were measured. Results are shown in Table 2.

As for the films obtained in Examples 1 to 4 and Comparative Example 4, an evaluation test for volatile additives were carried out. Results are shown in Table 3.

TABLE 1

| Test piece | Size (mm) |
| --- | --- |
| Stainless sheet (SUS304) | 2.1 × 100 × 150 |
| Glass sheet | 1.5 × 100 × 150 |

Test method
(1) Adhesion strength to test piece

Each film cut into a 25-mm wide strip was placed on each test piece so as to face its layer B having a strong adhesive strength to the piece, compressed to effect adhesion using a compression roller (2 kg in weight, 45 mm in width and 90 mm in diameter) at a rate of about 300 mm/min by one back and forth, allowed to stand at 25° C. under a 50% RH atmosphere for 24 hours, and then pulled off at an angle of 90 degrees at a rate of 300 mm/min using a pulling test machine to measure the adhesion strength.

(2) Shear separation strength of front side layer and reverse side layer of film The front side layer and the reverse side layer of each film cut into a strip of 50 mm×10 cm were placed face-to-face, compressed for adhesion at 25° C. at a rate of 2 kg/cm²·3 second and allowed to stand under a 50% RH atmosphere for 24 hours, and then pulled off at an angle of 180 degrees at a rate of 500 mm/min to measure the shear separation strength.

(3) Test for evaluating volatile additive

A frame (200 mm width×450 mm length×350 mm height) was prepared, and a copper sheet test piece (1.2 mm thickness×30 mm×50 mm (C1100)) was hung with a nylon fishing thread in the frame. The frame was spiral-packaged using the produced film to yield a superposed width of 10 cm and the package was exposed to the following test environment.

Test environment: two cycles a day (25° C., 50% RH/50° C., 95% RH) Rust was induced with dew condensation. The effect was evaluated by five criteria. Test results 14 days and 35 days after the exposure were shown in Table 3.

| Evaluation standards: | □: No rust |
|---|---|
| | o: Spotted rust |
| | Δ: Rust in an area of less than 50% |
| | x: Rust in an area of less than 80% |
| | xx: Rust over the whole area |

TABLE 2

Adhesion strength to each test piece

| | Adhesion strength to each test piece (N/25 mm) | | Shear separation strength of facing front and reverse |
|---|---|---|---|
| Test method | Stainless plate | Glass plate | layers (N/25 mm) |
| Example 1 | 1.9 | 1.9 | 25.0 |
| 2 | 2.1 | 2.5 | 28.0 |
| 3 | 2.4 | 2.7 | 37.0 |
| 4 | 2.4 | 2.5 | 30.0 |
| Comparative Example 1 | 0.0 | 0.0 | 0.1 |
| 2 | 0.0 | 0.1 | 1.4 |
| 3 | 2.0 | 2.1 | 1.2 |
| 4 | 0.0 | 0.0 | 0.0 |

TABLE 3

Evaluation test for volatile additive

| Test method | Evaluation test for volatile additive | |
|---|---|---|
| Days | After 14 days | After 35 days |
| Example 1 A1 surface: test piece side | x | xx |
| Example 1 A1 surface: opposite to test piece side | x | xx |
| Example 2 A2 surface: test piece side | o | o |
| Example 2 A2 surface: opposite to test piece side | □ | □ |
| Example 3 A3 surface: test piece side | □ | □ |
| Example 3 A3 surface: opposite to test piece side | □ | o |
| Example 4 A4 surface: test piece side | x | xx |
| Example 4 A4 surface: opposite to test piece side | x | xx |
| Comparative Example 4 a4 surface: test piece side | Δ | x |
| Comparative Example 4 a4 surface: opposite to test piece side | o | Δ |

Effective adhesiveness could be exerted between the films and the subjects for adhesion and between facing front and reverse surfaces of films could be attained by adding the adhesiveness-rendering resin to layer A and the adhesiveness-rendering resin and the plasticizing oil to layer B. Furthermore, volatilization of volatile components upon molding could be prevented by placing a layer containing volatile components between layer A and layer B; and further, the surface to exert the effect of the volatile components could be controlled by changing the average resin density of layer A and layer B.

Effectiveness of the Invention

Laminated films for packaging of the present invention exert self-adhesiveness between the front and reverse sides of the films facing each other upon packaging, and in cases where a layer containing a volatile component is further placed as an intermediate layer, volatilization loss of the volatile component upon melt molding can be prevented. The film surface which releases the volatile component can be controlled by incorporating an adhesiveness-rendering resin having a resin density higher than that of a thermoplastic resin, and at the same time, the quality of products to be packaged is not damaged. Thus, the films exert their effect particularly when used for spiral packaging.

What is claimed is:

1. A laminated film composite suitable for spiral packaging, which comprises at least two layers containing:
    (A) mixed-resin layer A comprising at least (i) a polyolefin resin having a resin density of more than 0.910 g/cm$^3$, and
    (B) mixed-resin layer B comprising at least (I) a linear low density polyethylene resin having a resin density of 0.860 to 0.920 g/cm$^3$,
    one of mixed-resin layer A or B further comprising (ii) a resin composition containing at least one kind of adhesiveness-rendering resin having a resin density of more than 0.950 g/cm$^3$ selected from rosin resins, terpene resins or petroleum resins at a concentration of 0.002 to 12.0% by weight;
    the other layer further comprising (iii) a resin composition containing at least one kind of resin selected from the abovementioned adhesiveness-rendering resins at a concentration of 0.05 to 25.0% by weight and (iv) at least one kind of plasticizing oil selected from mineral oils, polybutene, polyisobutylene, liquid polyacrylates or lanolin at a concentration of 0.01 to 8.0% by weight.

2. The laminated film composite according to claim 1, wherein mixed-resin layer A comprises the polyolefin resin (i) and the resin composition (ii), mixed-resin layer B comprises the linear low density polyethylene resin (I), the resin composition (iii), and the plasticizing oil (iv).

3. The laminated film composite according to claim 1, wherein mixed-resin layer A comprises the polyolefin resin (i), the resin composition (iii), and the plasticizing oil (iv), mixed-resin layer B comprises the linear low density polyethylene resin (i) and the resin composition (ii).

4. The laminated film composite according to claim 1, wherein the linear low density polyethylene resin (I) is a linear low density polyethylene resin polymerized using a single site metallocene catalyst.

5. The laminated film composite according to claim 1, wherein the linear low density polyethylene resin (I) has a melt flow rate (MFR) of 0.8 to 9.5 g/10 min at 190° C.

6. The laminated film composite according to claim 1, wherein at least either one of layer A or B further comprises (v) at least one kind of volatile additive selected from amine compounds, heterocyclic compounds, nitrite compounds or benzoate compounds at a concentration of 0.01 to 6.0% by weight.

7. The laminated film composite according to claim 1, further comprising layer C interposed between layer A and layer B, said layer C comprising a composition containing (v) at least one kind of volatile additive selected from amine compounds, heterocyclic compounds, nitrite compounds or benzoate compounds at a concentration of 0.01 to 6.0% by weight.

8. The laminated film composite according to claim 6, wherein the volatile additive (v) has a melting point relatively close to that of the thermoplastic resins used as the base material to exert its effect for providing a fragrance or preventing rust.

9. The laminated film composite according to claim 7, wherein the volatile additive (v) has a melting point relatively close to that of the thermoplastic resins used as the base material to exert its effect for providing a fragrance or preventing rust.

10. The laminated film composite according to claim 8, wherein the melting point is between 80 and 250° C.

11. The laminated film composite according to claim 9, wherein the melting point is between 80 and 250° C.

12. The laminated film composite according to claim 6, wherein the volatile additive (v) is at least one kind of component selected from the group consisting of amine compounds selected from cyclohexylamine carbamate and cyclohexylamine laurate, heterocyclic compounds selected from carboxybenzotriazole, tolyltriazole, benzotriazole, and 3-methyl-5-hydroxypyrazole, nitrite compounds selected from dicyclohexylammonium nitrite and sodium nitrite, benzoates such as ammonium benzoate.

13. The laminated film composite according to claim 7, wherein the volatile additive (v) is at least one kind of component selected from the group consisting of amine compounds selected from cyclohexylamine carbamate and cyclohexylamine laurate, heterocyclic compounds selected from carboxybenzotriazole, tolyltriazole, benzotriazole, and 3-methyl-5-hydroxypyrazole, nitrite compounds selected from dicyclohexylammonium nitrite and sodium nitrite, benzoates such as ammonium benzoate.

* * * * *